US012808512B2

(12) United States Patent
Chiu et al.

(10) Patent No.: US 12,808,512 B2
(45) Date of Patent: Nov. 24, 2026

(54) LIGHT-EMITTING DEVICE

(71) Applicant: ASUSTeK COMPUTER INC., Taipei City (TW)

(72) Inventors: Lin-Wei Chiu, Taipei City (TW); Hsin-Yu Tsao, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 0 days.

(21) Appl. No.: 19/362,503

(22) Filed: Oct. 20, 2025

(65) Prior Publication Data

US 2026/0185681 A1 Jul. 2, 2026

(30) Foreign Application Priority Data

Jan. 2, 2025 (TW) ................................ 114100095

(51) Int. Cl.
*F21V 9/20* (2018.01)
*F21Y 115/10* (2016.01)

(52) U.S. Cl.
CPC ............ *F21V 9/20* (2018.02); *F21V 2200/20* (2015.01); *F21Y 2115/10* (2016.08)

(58) Field of Classification Search
CPC ....... G02B 6/006; G09F 13/049; G09F 13/18; G09F 2013/1836; G09F 2013/1831; G09F 2013/1827; G09F 2013/1822; G09F 2013/1818; G09F 2013/1813; G09F 2013/1809; G09F 2013/1804; F21Y 2115/20; F21V 2200/20; F21V 9/20
See application file for complete search history.

(56) References Cited

U.S. PATENT DOCUMENTS 6,918,679 B2 * 7/2005 Wu ......................... G09F 13/04 362/132
2008/0049447 A1 * 2/2008 Jung ......................... F21S 8/00 362/612
2022/0031071 A1 * 2/2022 Oh ............................ E06B 7/30
2024/0310571 A1 * 9/2024 Donahue .............. G02B 6/0076

FOREIGN PATENT DOCUMENTS

| | | |
|---|---|---|
| CN | 105137526 | 12/2015 |
| CN | 106024476 | 10/2016 |
| CN | 211325007 | 8/2020 |
| CN | 212108262 | 12/2020 |
| JP | 2022149789 | 10/2022 |
| TW | 201011198 | 3/2010 |

* cited by examiner

*Primary Examiner* — Anabel Ton
(74) *Attorney, Agent, or Firm* — JCIPRNET

(57) ABSTRACT

Provided is a light-emitting device, which includes a light source, a first light guide plate part and a first film. The first light guide plate part includes a first end surface, a second end surface and a fixing member located inside. The light source is disposed next to the first end surface. The first film includes a first portion. The first portion covers the second end surface. The first portion partially transmits light to uniform a brightness of a light emitted by the light source at a projection of the fixing member on the second end surface with a brightness at other parts of the second end surface.

14 Claims, 9 Drawing Sheets

LIGHT-EMITTING DEVICE

CROSS-REFERENCE TO RELATED APPLICATION

This application claims the priority benefit of Taiwan application serial no. 114100095, filed on Jan. 2, 2025. The entirety of the above-mentioned patent application is hereby incorporated by reference herein and made a part of this specification.

BACKGROUND

Technical Field

The disclosure relates to a light-emitting device, and particularly to a light-emitting device which can emit light uniformly.

Related Art

Currently, as some light guide plates can be disposed through by fixing structures such as screws to be fixed to a system. If the light guide plate emits light from an end surface and enters such a light guide plate, bright spots may be formed on the end surface of the light guide plate corresponding to the fixing structures, which caused brightness difference of other parts of the end surface, causing non-uniform brightness.

SUMMARY

The disclosure provides a light-emitting device, which includes a light source, a first light guide plate part, and a first film. The first light guide plate part includes a first end surface, a second end surface, and a fixing member located inside. The light source is disposed next to the first end surface. The first film includes a first portion. The first portion covers the second end surface. The first portion partially transmits light to uniform a brightness of a light emitted by the light source at a projection of the fixing member on the second end surface with a brightness at other parts of the second end surface.

Based on the above, the first light guide plate part of the light-emitting device of the disclosure is provided with the fixing member located inside. The light source is disposed next to the first end surface of the first light guide plate part. The first portion of the first film covers the second end surface of the first light guide plate part. The first portion partially transmits light to uniform the brightness of the light emitted by the light source at the projection of the fixing member on the second end surface with the brightness at other parts of the second end surface. Therefore, the light-emitting device of the disclosure can provide a visual effect with uniform brightness at a part corresponding to the second end surface.

DESCRIPTION OF THE EMBODIMENTS

Figure 1:
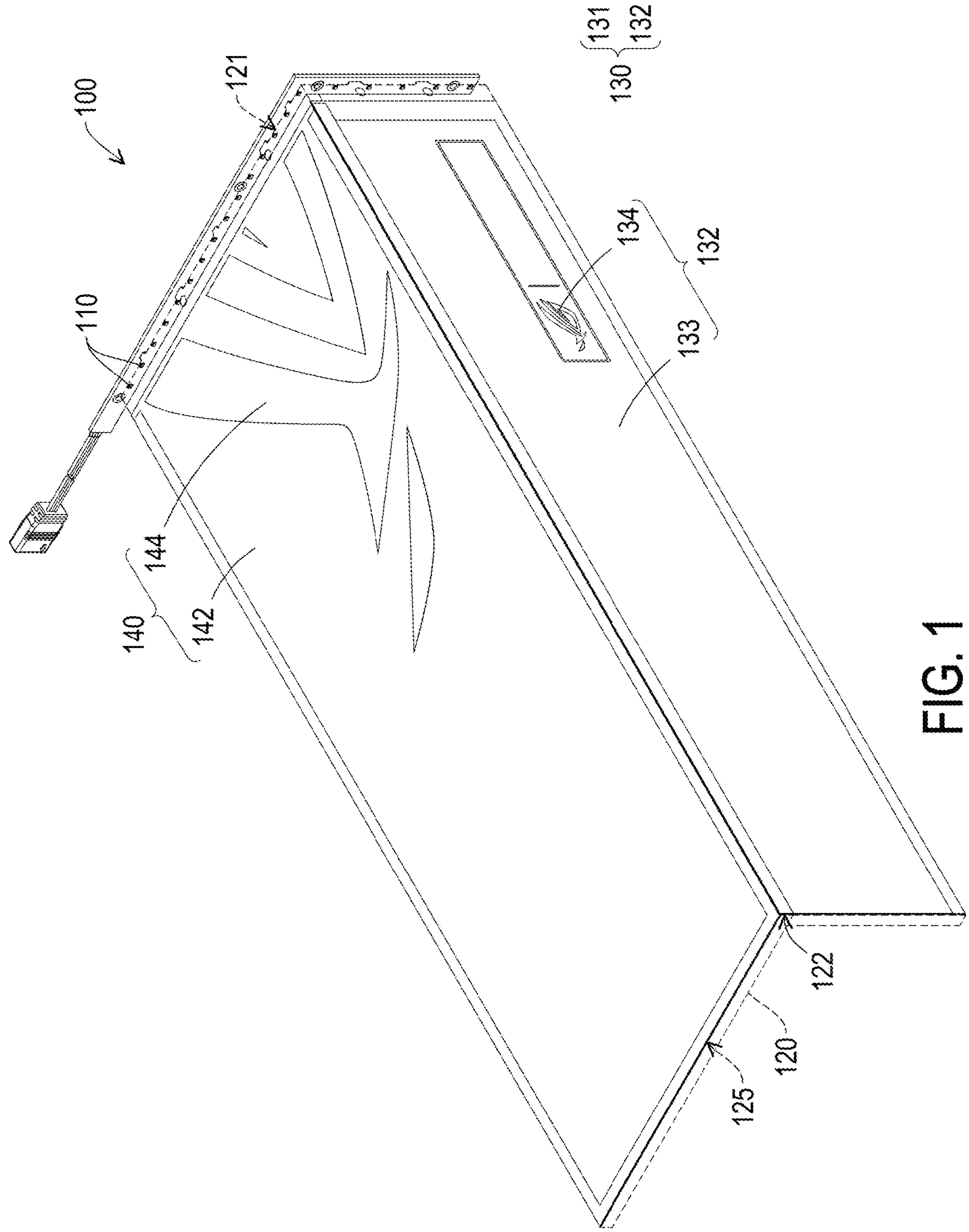
FIG. 1 is a perspective schematic view of a light-emitting device according to an embodiment of the disclosure.
Figure 2:
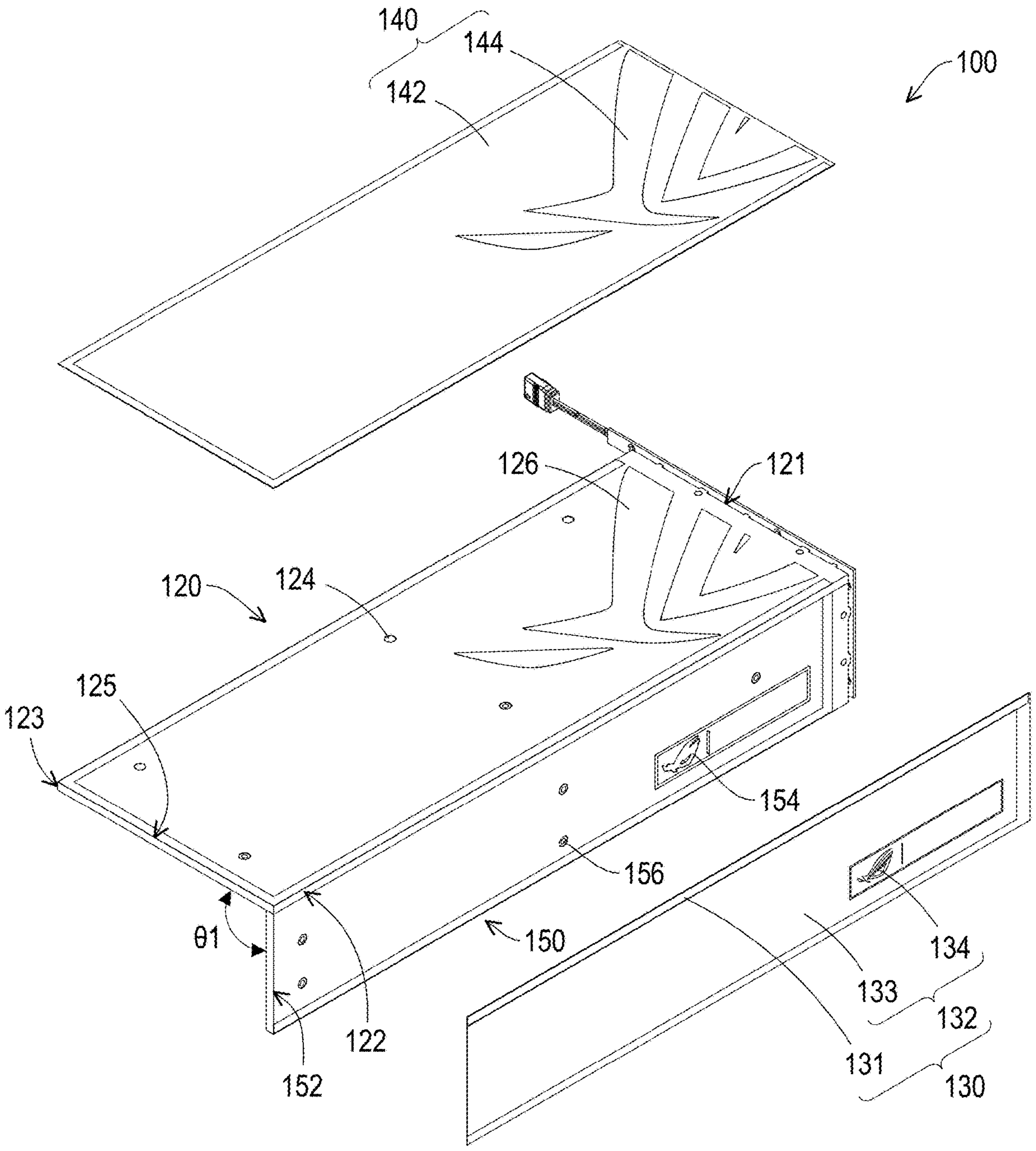
FIG. 2 is an exploded schematic view of FIG. 1.
Figure 3:
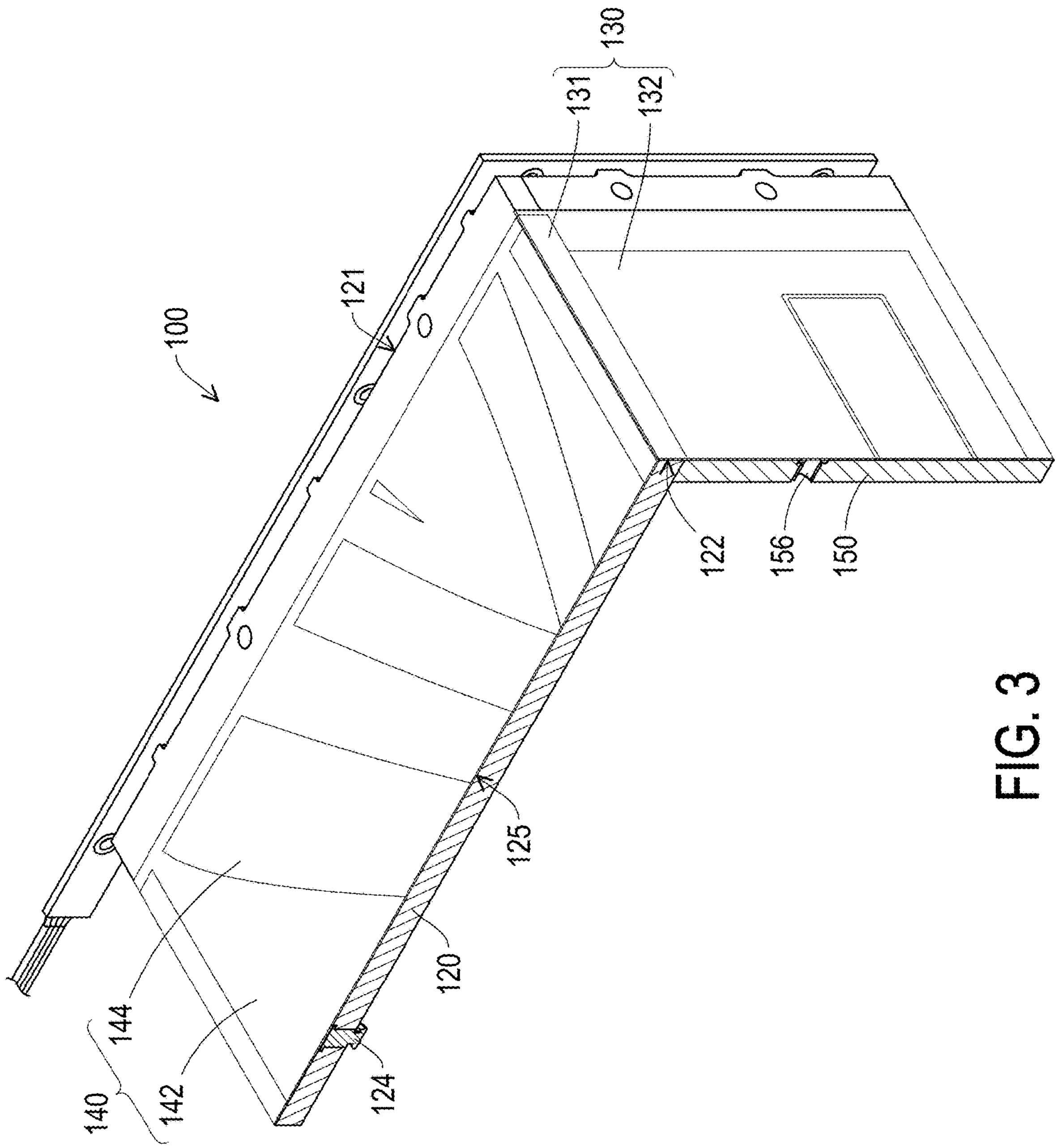
FIG. 3 is a perspective cross-sectional schematic view of FIG. 1.
Figure 4:
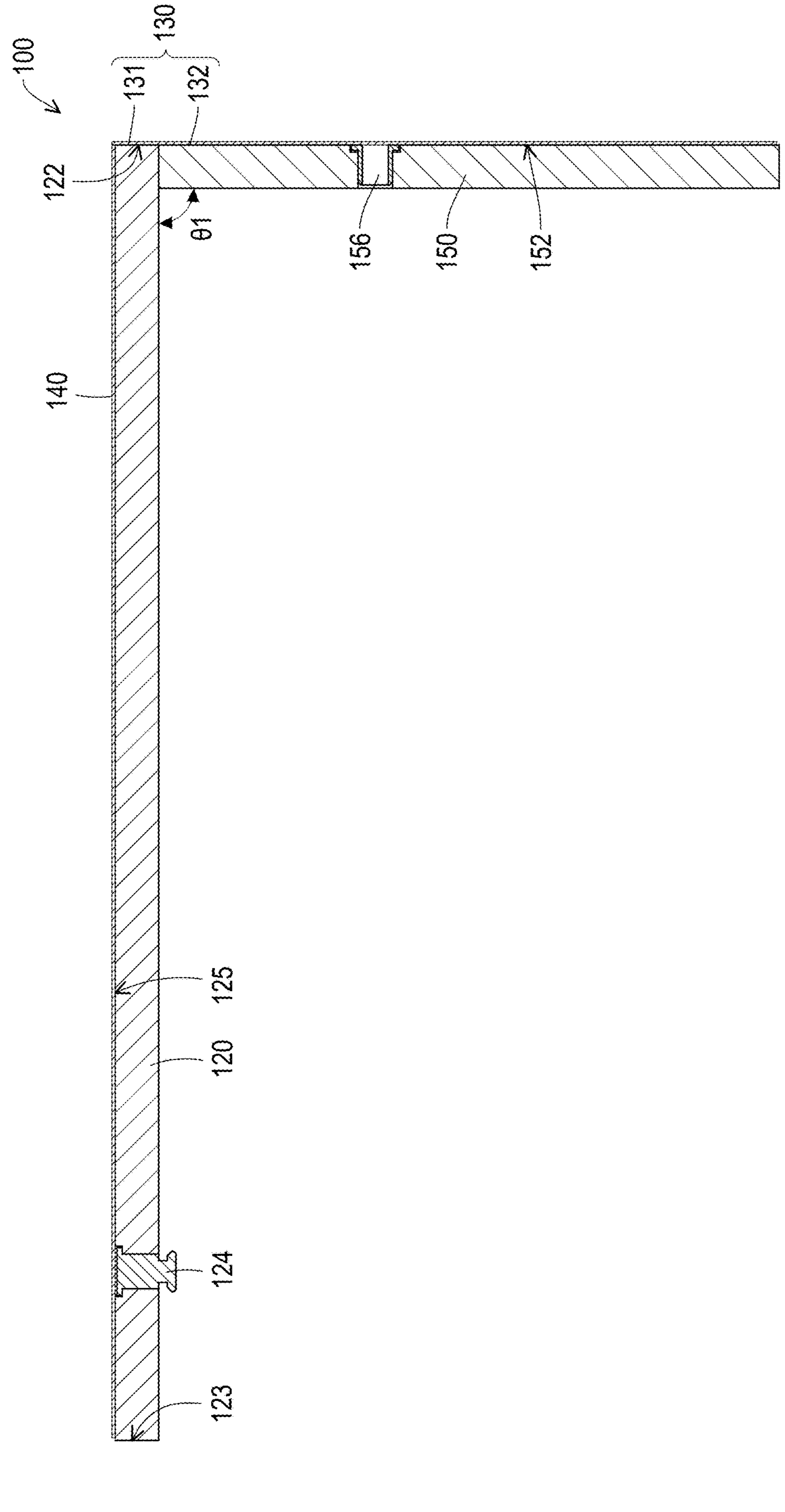
FIG. 4 is a schematic view of another viewing angle of FIG. 3.

FIG. 1 is a perspective schematic view of a light-emitting device according to an embodiment of the disclosure. FIG. 2 is an exploded schematic view of FIG. 1. FIG. 3 is a perspective cross-sectional schematic view of FIG. 1. FIG. 4 is a schematic view of another viewing angle of FIG. 3. It should be noted that in FIG. 1, a first light guide plate part 120 is represented by dashed lines.

Please refer to FIG. 1 to FIG. 4. The light-emitting device 100 of the embodiment includes a light source 110 (FIG. 1), a first light guide plate part 120, and a first film 130. In one embodiment, the light source 110 is a white light source 110 or a light-emitting diode of a red, green, blue, or white light. The type of the light source 110 is not limited thereto.

In the embodiment, the first light guide plate part 120 is a plate. The first light guide plate part 120 includes a first end surface 121 (such as a short edge), a second end surface 122 (such as a long edge), a first surface 125 (such as an upper surface), and a fixing member 124 located inside.

The light source 110 is disposed next to the first end surface 121, and a light emitted from the light source 110 may enter the first light guide plate part 120 from the first end surface 121. In addition, in the embodiment, the fixing member 124 is, for example, a screw, stud, or rivet, but the type of the fixing member 124 is not limited thereto.

As shown in FIG. 2, in the embodiment, the first surface 125 of the first light guide plate part 120 includes a first light-emitting area 126. The first light-emitting area 126 is, for example, a part on the first surface 125 provided with dots or printed ink (which may be white ink or semi-transparent white ink). In one embodiment, the first light-emitting area 126 is a pattern or a text. In the embodiment, a light entering into the first light guide plate part 120 is emitted through the first light-emitting area 126 and the second end surface 122.

The light-emitting device 100 may further optionally include a second light guide plate part 150. The second light guide plate part 150 is connected to the first light guide plate part 120 near the second end surface 122. Specifically, in the embodiment, the second light guide plate part 150 is vertically connected to a lower surface of the first light guide plate part 120, and a second surface 152 is flush with the second end surface 122.

Therefore, there is a first included angle θ1 between the first light guide plate part 120 and the second light guide plate part 150. The first included angle θ1 is, for example, 90 degrees. The first light guide plate part 120 and the second light guide plate part 150 are presented as an L-shape, but the first included angle θ1 is not limited thereto. In the embodiment, the first light guide plate part 120 and the second light guide plate part 150 are two separate pieces. In other embodiments, the first light guide plate part 120 and the second light guide plate part 150 may also be integrated as one piece.

The second light guide plate part 150 includes the second surface 152. The second surface 152 of the second light guide plate part 150 includes a second light-emitting area 154. The second light-emitting area 154 is, for example, a part on the second surface 152 provided with dots or printed ink (which may be white ink or semi-transparent white ink). In one embodiment, the second light-emitting area 154 is a pattern or a text. In one embodiment, a light entering into the second light guide plate part 150 is emitted through the second light-emitting area 154.

In the embodiment, the first film 130 is, for example, a mylar. The first film 130 has ink printed thereon. The first film 130 includes a first portion 131 and a second portion 132. The first portion 131 and the second portion 132 are coplanar. The first portion 131 covers the second end surface 122 of the first light guide plate part 120. The second portion 132 covers the second surface 152 of the second light guide plate part 150.

In the embodiment, in addition to the first light-emitting area 126 of the first light guide plate part 120, the second end surface 122 of the first light guide plate part 120 is also a region intended for emitting light. Since the first light guide plate part 120 is provided with the fixing member 124 therein, if a light is to be directly emitted from the second end surface 122 of the first light guide plate part 120, the light at the second end surface 122 of the first light guide plate part 120 may generate bright spots (with higher brightness) at a projection of the fixing member 124 on the second end surface 122, which results in poor light-emitting uniformity at the second end surface 122 of the first light guide plate part 120.

Therefore, in the embodiment, the first portion 131 of the first film 130 intentionally covers the second end surface 122 of the first light guide plate part 120, and the first portion 131 of the first film 130 is allowed to partially transmit light to uniform the brightness of the light emitted by the light source 110 at the projection of the fixing member 124 on the second end surface 122 with a brightness at other parts of the second end surface 122. In this way, the light-emitting device 100 can provide a visual effect of uniform brightness at a part corresponding to the second end surface 122.

In the embodiment, the first portion 131 of the first film 130 is, for example, printed or spray-coated with white ink, but the disclosure is not limited thereto. A light transmittance of the first portion 131 of the first film 130 is between 0.5% and 15%. In an embodiment, the light transmittance of the first portion 131 of the first film 130 is between 5% and 15%. In an embodiment, the light transmittance of the first portion 131 of the first film 130 is between 5% and 10%.

Moreover, in the embodiment, the second portion 132 of the first film 130 includes a first light-shielding area 133 and a first light-transmitting area 134. The first light-transmitting area 134 of the first film 130 corresponds to the second light-emitting area 154 of the second surface 152 of the second light guide plate part 150. The first light-shielding area 133 shields a fixing hole 156 located inside the second light guide plate part 150. The first light-shielding area 133 is, for example, printed or spray-coated with black ink, but the disclosure is not limited thereto. Therefore, users may see a light effect of a specific pattern from a front side of the second surface 152 of the second light guide plate part 150 and the first film 130.

In addition, in the embodiment, the light-emitting device 100 further includes a second film 140. The second film 140 covers the first surface 125 of the first light guide plate part 120. The second film 140 includes a second light-shielding area 142 and a second light-transmitting area 144. The second light-transmitting area 144 corresponds to the first light-emitting area 126. The fixing member 124 is shielded by the first light-shielding area 133 of the first film 130. Therefore, users may also see a light effect of a specific pattern over the first surface 125 of the first light guide plate part 120 and the second film 140.

It is worth mentioning that in the embodiment, white ink is printed or spray-coated on the first portion 131 of the first film 130 to allow the light transmittance of the first portion 131 of the first film 130 to be between 0.5% and 15% in order to allow the first portion 131 of the first film 130 to partially transmit light. Since the ink is printed or spray-coated on the first portion 131 of the first film 130, a condition of ink printing or spray-coating is precisely controlled during manufacturing to control the light transmittance to be within a certain range. Compared to directly spray-coating ink on the second end surface 122, since the area of the second end surface 122 is small, screen printing cannot be used, the ink uniformity of the spray-coating is difficult to control, and the precision is lower. In the embodiment, printing or spray-coating ink on the first portion 131 of the first film 130 may have a better process quality.

Figure 5:
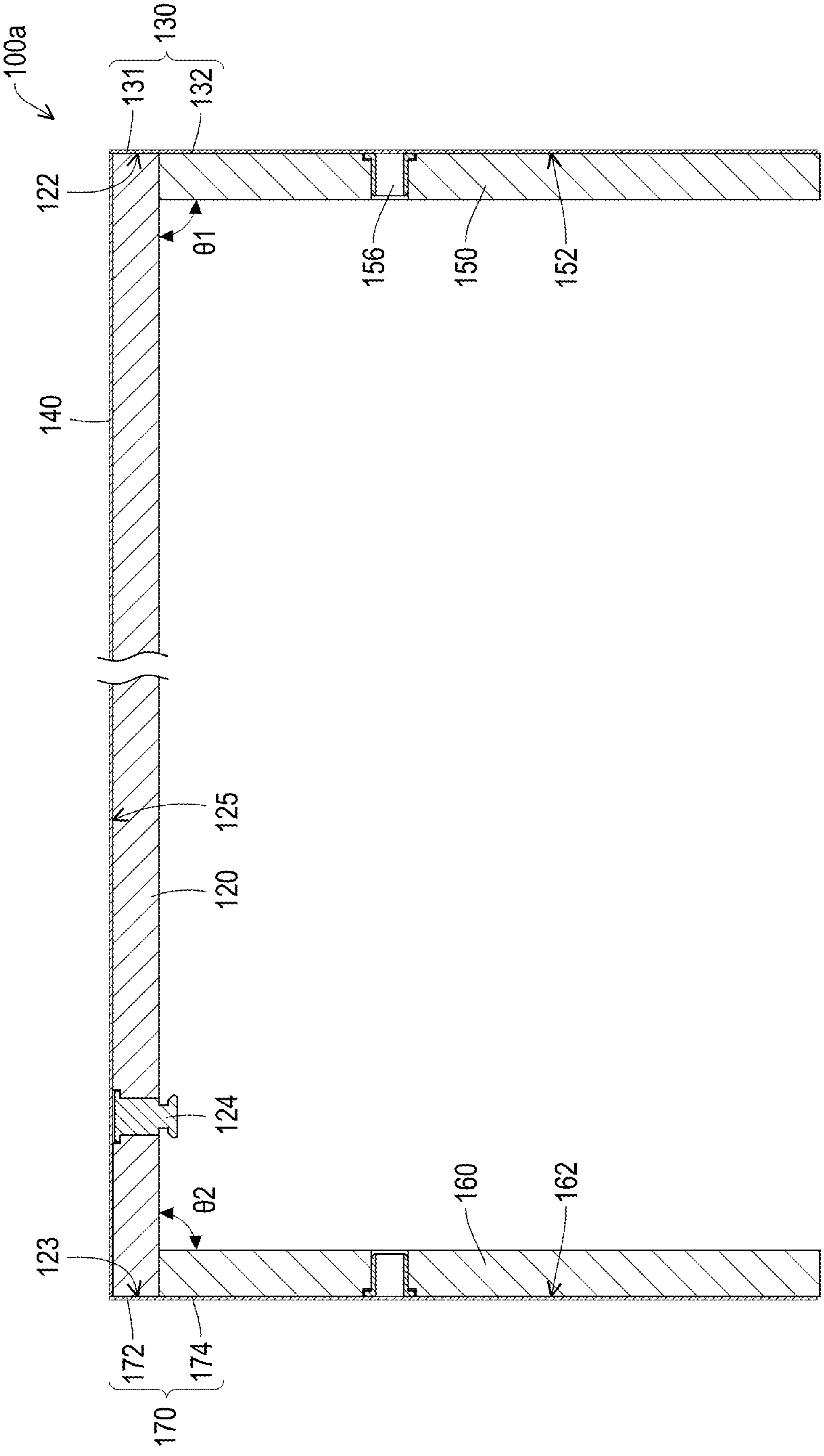
FIG. 5 is a schematic cross-sectional view of a light-emitting device according to another embodiment of the disclosure.

FIG. 5 is a schematic cross-sectional view of a light-emitting device according to another embodiment of the disclosure. Please refer to FIG. 5. In the embodiment, a main difference between a light-emitting device **100*a* in FIG. 5 and the light-emitting device 100 in FIG. 4 is that in the embodiment, the light-emitting device 100*a* further includes a third light guide plate part 160 and a third film 170**.

In the embodiment, the first light guide plate part 120 includes a third end surface 123 opposite to the second end surface 122. The third light guide plate part 160 is connected to the first light guide plate part 120 near the third end surface 123. Specifically, in the embodiment, the third light guide plate part 160 is vertically connected to a bottom surface of the first light guide plate part 120. The third light guide plate part 160 includes a third surface 162, and the third surface 162 is flush with the third end surface 123.

There is a second included angle θ2 between the third light guide plate part 160 and the first light guide plate part 120. The second included angle θ2 is, for example, 90 degrees. The first light guide plate part 120 and the third light guide plate part 160 are presented as an L-shape, and the first light guide plate part 120, the second light guide plate part 150, and the third light guide plate part 160 are commonly presented as a U-shape, but the second included angle θ2 is not limited thereto. In the embodiment, the first light guide plate part 120 and the third light guide plate part 160 are two separate pieces. In other embodiments, the first light guide plate part 120 and the third light guide plate part 160 may also be integrated as one piece.

Similarly, if the third end surface 123 of the first light guide plate part 120 is an region intended for emitting light. Since the first light guide plate part 120 is provided with the fixing member 124 therein, if a light is to be directly emitted from the third end surface 123 of the first light guide plate part 120, the light at the third end surface 123 of the first light guide plate part 120 may generate bright spots (with higher brightness) at a projection of the fixing member 124 on the third end surface 123, resulting in poor light-emitting uniformity at the third end surface 123 of the first light guide plate part 120.

In the embodiment, a part 172 of the third film 170 covers the third end surface 123 of the first light guide plate part 120. The third film 170 partially transmits light at the part 172 covering the third end surface 123 to uniform a brightness of a light emitted by the light source 110 at the projection of the fixing member 124 on the third end surface 123 with a brightness at other parts of the third end surface 123. In this way, the light-emitting device 100 can provide a visual effect of uniform brightness at a part corresponding to the third end surface 123.

In the embodiment, the part 172 of the third film 170 is, for example, printed or spray-coated with white ink, but the disclosure is not limited thereto. A light transmittance of the third film 170 at the part 172 covering the third end surface 123 is between 0.5% and 15%. In an embodiment, the light transmittance of the third film 170 at the part 172 covering the third end surface 123 is between 5% and 15%. In an embodiment, the light transmittance of the third film 170 at the part 172 covering the third end surface 123 is between 5% and 10%.

Moreover, a part 174 of the third film 170 covers the third surface 162 of the third light guide plate part 160. The part 174 may include a light-shielding area and a light-transmitting area to allow a light in the third light guide plate part 160 to be emitted from the third surface 162 and the light-transmitting area of the part 174.

Figure 6:
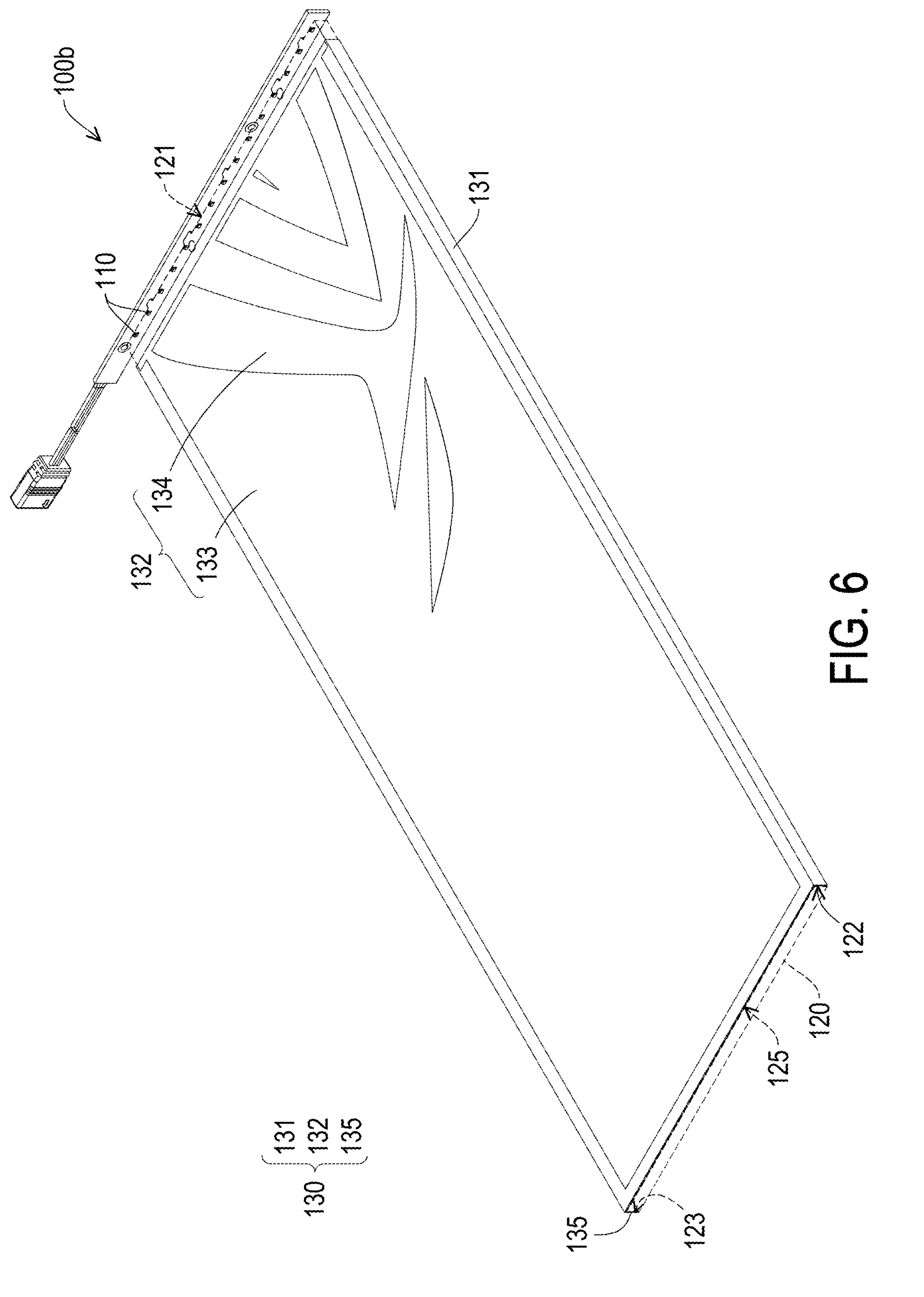
FIG. 6 is a perspective schematic view of a light-emitting device according to another embodiment of the disclosure.
Figure 7:
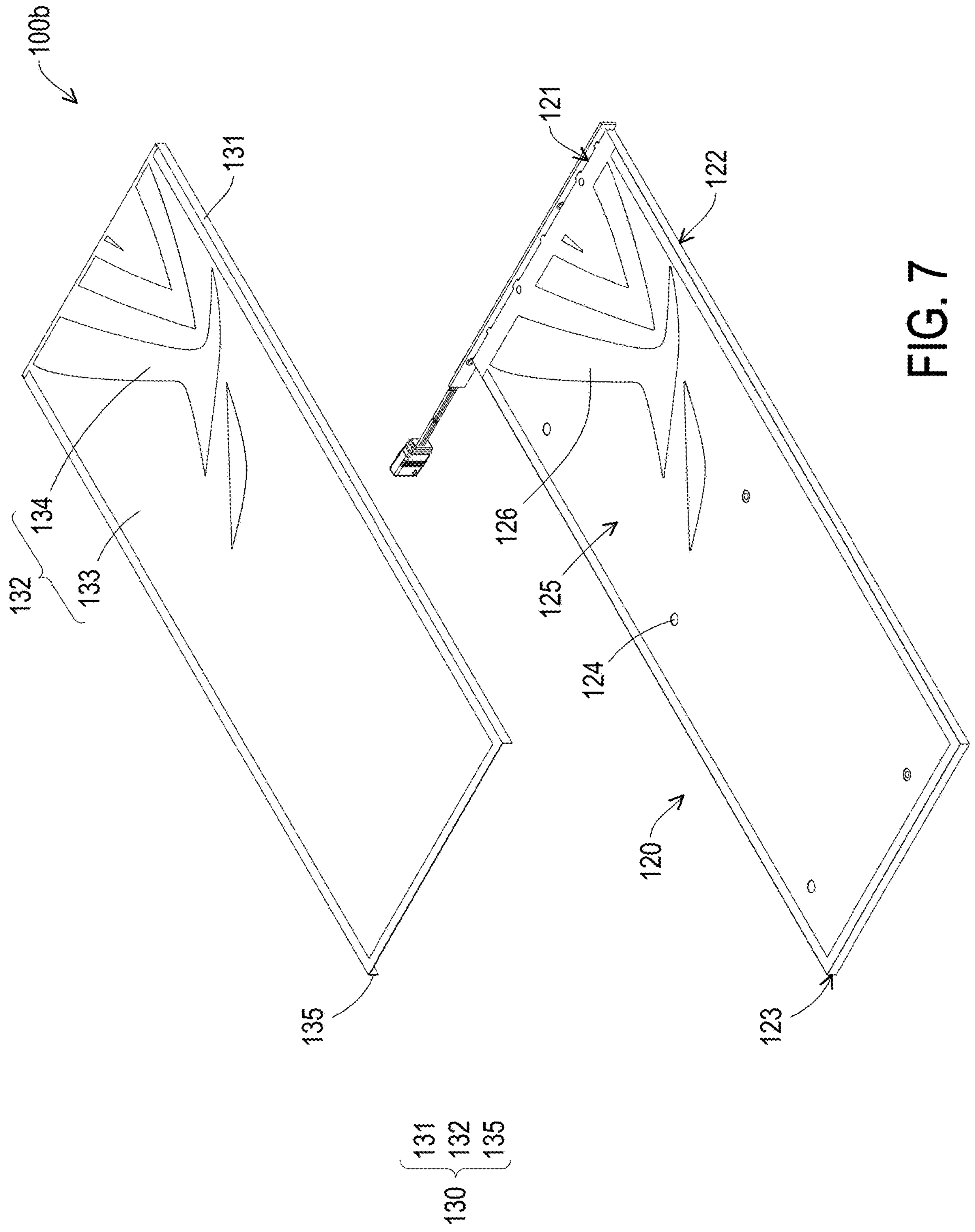
FIG. 7 is an exploded schematic view of FIG. 6.
Figure 8:
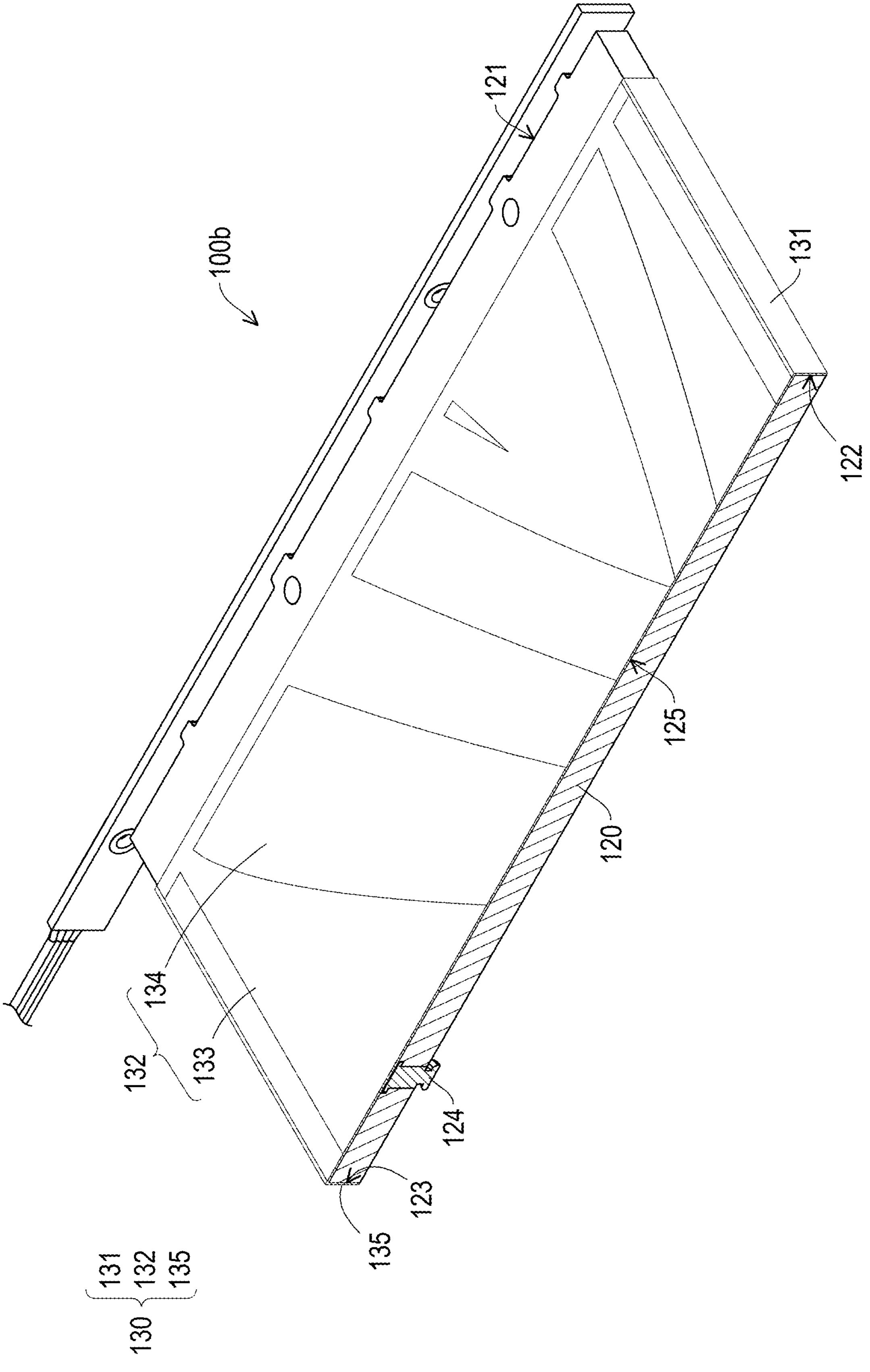
FIG. 8 is a perspective cross-sectional schematic view of FIG. 6.
Figure 9:
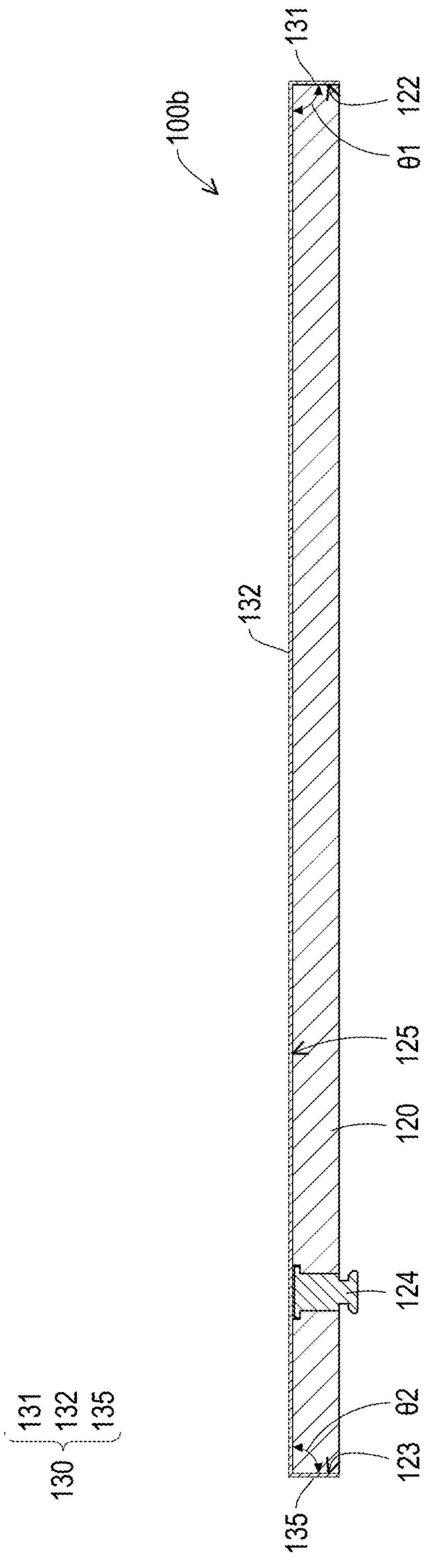
FIG. 9 is a schematic view of another viewing angle of FIG. 8.

FIG. 6 is a perspective schematic view of a light-emitting device according to another embodiment of the disclosure. FIG. 7 is an exploded schematic view of FIG. 6. FIG. 8 is a perspective cross-sectional schematic view of FIG. 6. FIG. 9 is a schematic view of another viewing angle of FIG. 8. It should be noted that the first light guide plate part 120 in FIG. 6 is represented by dashed lines.

Please refer to FIG. 6 to FIG. 9. A main difference between a light-emitting device **100*b* in FIG. 6 and the light-emitting device 100 in FIG. 1 is that in the embodiment, the light guide plate of the light-emitting device 100*b* only includes the first light guide plate part 120, and does not have the second light guide plate part 150. The film of the light-emitting device 100*b* only includes the first film 130, and does not have the second film 140**.

In the embodiment, the first light guide plate part 120 includes the first surface 125, the first end surface 121, the second end surface 122, and the third end surface 123. The light source 110 (FIG. 6) is disposed next to the first end surface 121. The first surface 125 includes the first light-emitting area 126.

The first film 130 includes the first portion 131, the second portion 132, and a third portion 135. The first portion 131 of the first film 130 covers the second end surface 122 of the first light guide plate part 120. The second portion 132 of the first film 130 covers the first surface 125 of the first light guide plate part 120. The third portion 135 of the first film 130 covers the third end surface 123 of the first light guide plate part 120.

There is a first included angle θ1 between the second portion 132 and the first portion 131. There is a second included angle θ2 between the second portion 132 and the third portion 135. In the embodiment, each of the first included angle θ1 and the second included angle θ2 is 90 degrees, but the first included angle θ1 and the second included angle θ2 are not limited thereto.

The second portion 132 of the first film 130 includes a first light-shielding area 133 and a first light-transmitting area 134. The first light-transmitting area 134 corresponds to the first light-emitting area 126. The second portion 132 of the first film 130 covers the first surface 125.

In addition to the first light-emitting area 126 of the first light guide plate part 120, the second end surface 122 and the third end surface 123 of the first light guide plate part 120 are regions intended for emitting light. Since the first light guide plate part 120 is provided with the fixing member 124 therein, if a light is to be directly emitted from the second end surface 122 and the third end surface 123 of the first light guide plate part 120, the light at the second end surface 122 and the third end surface 123 of the first light guide plate part 120 may generate bright spots (with higher brightness) at a projection of the fixing member 124 on the second end surface 122 and the third end surface 123, resulting in poor light-emitting uniformity at the second end surface 122 and the third end surface 123 of the first light guide plate part 120.

Therefore, in the embodiment, the first portion 131 of the first film 130 intentionally covers the second end surface 122 of the first light guide plate part 120, and the third portion 135 of the first film 130 covers the third end surface 123 of the first light guide plate part 120. Each of the first portion 131 and the third portion 135 of the first film 130 partially transmits light to uniform a brightness of a light emitted by the light source 110 at the projection of the fixing member 124 on the second end surface 122 and the third end surface 123 with a brightness at other parts of the second end surface 122 and the third end surface 123. In this way, the light-emitting device 100 can provide a visual effect of uniform brightness at a part corresponding to the second end surface 122 and the third end surface 123.

In the embodiment, the first portion 131 and the third portion 135 of the first film 130 is, for example, printed or spray-coated with white ink, but the disclosure is not limited thereto. A light transmittance of the first portion 131 and the third portion 135 is between 0.5% and 15%. In an embodiment, the light transmittance of the first portion 131 and the third portion 135 is between 5% and 15%. In an embodiment, the light transmittance of the first portion 131 and the third portion 135 is between 5% and 10%.

In summary, the first light guide plate part of the light-emitting device of the disclosure is provided with the fixing member located inside. The light source is disposed next to the first end surface of the first light guide plate part. The first portion of the first film covers the second end surface of the first light guide plate part. The first portion partially transmits light to uniform the brightness of the light emitted by the light source at the projection of the fixing member on the second end surface with the brightness at other parts of the second end surface. Therefore, the light-emitting device of the disclosure can provide the visual effect of uniform brightness at the part corresponding to the second end surface.

What is claimed is:

1. A light-emitting device, comprising:
- a light source;
- a first light guide plate part, comprising a first end surface, a second end surface and a fixing member located inside, wherein the light source is disposed next to the first end surface; and
- a first film, comprising a first portion, wherein the first portion covers the second end surface, the first portion partially transmits light to uniform a brightness of a light emitted by the light source at a projection of the fixing member on the second end surface with a brightness at other parts of the second end surface,
- wherein a light transmittance of the first portion is between 0.5% and 15%,
- wherein the first light guide plate part comprises two largest surfaces opposite to each other, an area of each of the two largest surfaces is greater than an area of the second end surface.

2. The light-emitting device according to claim 1, further comprising:

a second film, wherein the first light guide plate part comprises a first surface, and the second film covers the first surface; and a second light guide plate part, connected to the first light guide plate part near the second end surface, wherein there is a first included angle between the first light guide plate part and the second light guide plate part, the second light guide plate part comprises a second surface, the first film further comprises a second portion, the second portion covers the second surface.

3. The light-emitting device according to claim 2, wherein the second portion of the first film comprises a first light-shielding area and a first light-transmitting area, the second film comprises a second light-shielding area and a second light-transmitting area, the first surface of the first light guide plate part comprises a first light-emitting area, the second light-transmitting area corresponds to the first light-emitting area, the second surface of the second light guide plate part comprises a second light-emitting area, and the first light-transmitting area corresponds to the second light-emitting area.

4. The light-emitting device according to claim 2, wherein the second surface is flush with the second end surface.

5. The light-emitting device according to claim 2, wherein the first light guide plate part and the second light guide plate part are two separate pieces, or the first light guide plate part and the second light guide plate part are integrated as one piece.

6. The light-emitting device according to claim 2, further comprising:

a third light guide plate part, wherein the first light guide plate part comprises a third end surface, the third light guide plate part is connected to the first light guide plate part near the third end surface, there is a second included angle between the third light guide plate part and the first light guide plate part, and the third light guide plate part comprises a third surface; and a third film, covering the third end surface and the third surface, wherein a part of the third film covering the third end surface partially transmits light to uniform a brightness of a light emitted by the light source at a projection of the fixing member on the third end surface with a brightness at other parts of the third end surface.

7. The light-emitting device according to claim 6, wherein a light transmittance of the part of the third film covering the third end surface is between 0.5% and 15%.

8. The light-emitting device according to claim 6, wherein the third surface is flush with the third end surface.

9. The light-emitting device according to claim 6, wherein the first light guide plate part and the third light guide plate part are two separate pieces, or the first light guide plate part and the third light guide plate part are integrated as one piece.

10. The light-emitting device according to claim 1, wherein the first light guide plate part comprises a first surface, the first surface comprises a first light-emitting area, the first film comprises a second portion, there is a first included angle between the second portion and the first portion, the second portion comprises a first light-shielding area and a first light-transmitting area, the first light-transmitting area corresponds to the first light-emitting area, and the second portion of the first film covers the first surface.

11. The light-emitting device according to claim 10, wherein the first light guide plate part comprises a third end surface, the first film comprises a third portion, there is a second included angle between the second portion and the third portion, the third portion partially transmits light to uniform a brightness of a light emitted by the light source at a projection of the fixing member on the third end surface with a brightness at other parts of the third end surface.

12. The light-emitting device according to claim 11, wherein a light transmittance of the third portion is between 0.5% and 15%.

13. A light-emitting device, comprising:

a light source;

a first light guide plate part, comprising a first end surface, a second end surface and a fixing member located inside, wherein the light source is disposed next to the first end surface;

a first film, comprising a first portion, wherein the first portion covers the second end surface, the first portion partially transmits light to uniform a brightness of a light emitted by the light source at a projection of the fixing member on the second end surface with a brightness at other parts of the second end surface;

a second film, wherein the first light guide plate part comprises a first surface, and the second film covers the first surface; and a second light guide plate part, connected to the first light guide plate part near the second end surface, wherein there is a first included angle between the first light guide plate part and the second light guide plate part, the second light guide plate part comprises a second surface, the first film further comprises a second portion, the second portion covers the second surface.

14. A light-emitting device, comprising:

a light source;

a first light guide plate part, comprising a first end surface, a second end surface and a fixing member located inside, wherein the light source is disposed next to the first end surface;

a first film, comprising a first portion, wherein the first portion covers the second end surface, the first portion partially transmits light to uniform a brightness of a light emitted by the light source at a projection of the fixing member on the second end surface with a brightness at other parts of the second end surface, wherein the first light guide plate part comprises a first surface, the first surface comprises a first light-emitting area, the first film comprises a second portion, there is a first included angle between the second portion and the first portion, the second portion comprises a first light-shielding area and a first light-transmitting area, the first light-transmitting area corresponds to the first light-emitting area, and the second portion of the first film covers the first surface.

* * * * *